(12) United States Patent
Zhang et al.

(10) Patent No.: US 11,275,569 B1
(45) Date of Patent: Mar. 15, 2022

(54) TECHNIQUES AND ARCHITECTURES FOR PROVIDING CONTINUOUS INTEGRATION (CI) AND/OR CONTINUOUS DELIVERY (CD) IN A DATA LAKE ENVIRONMENT

(71) Applicant: salesforce.com, inc., San Francisco, CA (US)

(72) Inventors: Heng Zhang, San Jose, CA (US); Aaron Zhang, Richmond Hill (CA); Mahalaxmi Sanathkumar, San Francisco, CA (US); Utsavi Benani, Fremont, CA (US); Zhidong Ke, Milpitas, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 17/086,247

(22) Filed: Oct. 30, 2020

(51) Int. Cl.
*G06F 8/40* (2018.01)
*G06F 8/41* (2018.01)
*G06F 8/71* (2018.01)

(52) U.S. Cl.
CPC . *G06F 8/41* (2013.01); *G06F 8/71* (2013.01)

(58) Field of Classification Search
USPC ........................................................ 717/140
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — John Q Chavis
(74) *Attorney, Agent, or Firm* — Kwan & Olynick LLP

(57) ABSTRACT

Mechanisms and techniques for providing continuous integration and continuous deployment (CI/CD) for data lake applications are disclosed. Assembly of code for an app is managed with a CI platform to create a container within a shared environment within which the app runs. The container is isolated from other containers and bundles software, libraries and configuration files and can communicate with other containers through defined channels. The shared environment provides a platform for running the app. The app writes to one or more tables maintained in the shared environment. Assembly of subsequent versions of code for the app is managed by the CI platform. Deployment of the assembled subsequent version of the code to the container is managed by the CI platform. Integration tests are run on the deployed subsequent version of the code with the CI platform. The subsequent version of the code replaces the app in the shared environment when integration testing is complete.

18 Claims, 11 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2017/0169370 A1* | 6/2017 | Cornilescu ............ G06F 8/71 |
| 2019/0294536 A1* | 9/2019 | Avisror ............ G06F 11/3688 |

* cited by examiner

```
1  FROM docker.amz.relateiq.com/cbase/base:20200722
2  RUN apt-get update \
   && apt-get install –y python3 python3-pip gettext –-base \
   && rm –rf /var/lib/apt/lists/* \
   && apt-get clean \
   && rm –rf /var/lib/apt/lists/* /tmp/* var/tmp/*WORKDIR /app
3  RUN pip install databricks-cli
4  COPY docker/publish-only/scripts root/scripts
5  CMD /root/scxripts/run.sh
```

TECHNIQUES AND ARCHITECTURES FOR PROVIDING CONTINUOUS INTEGRATION (CI) AND/OR CONTINUOUS DELIVERY (CD) IN A DATA LAKE ENVIRONMENT

TECHNICAL FIELD

Embodiments relate to techniques for managing data traffic in environments not providing native atomic transactions to provide, for example, atomic data ingestion. More particularly, embodiments relate to techniques for managing data traffic in environments not providing native atomic transactions by, for example, utilizing two or more coordinated data tables.

BACKGROUND

A "data lake" is a collection data from multiple sources and is not stored in a standardized format. Because of this, collection of the data in the data lake is not as systematic and predictable as more structured collections of data. Thus, many of the tools that are utilized to ingest data into a data lake (or other data collection structures) do not (or cannot) provide atomic writes to the final data source.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is one embodiment of an example Docker file that can be utilized to support providing continuous integration and continuous deployment (CI/CD) for data lake applications.

DETAILED DESCRIPTION

Figure 2:
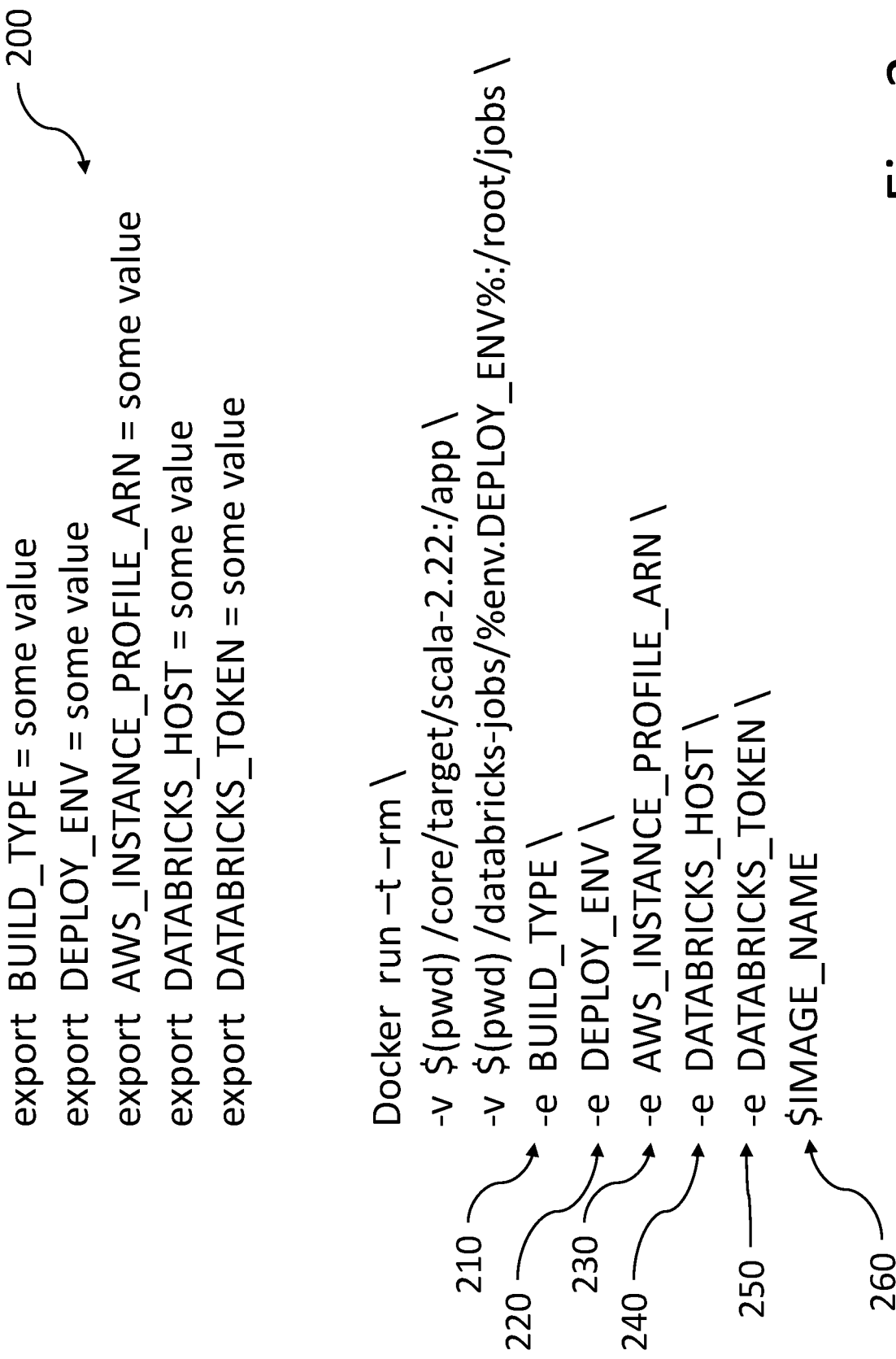
FIG. 2 is one embodiment of an example structure to create a container that can be utilized to support providing CI/CD for data lake applications.

In the following description, numerous specific details are set forth. However, embodiments of the invention may be practiced without these specific details. In other instances, well-known structures and techniques have not been shown in detail in order not to obscure the understanding of this description.

Some embodiments described herein can be based on a Databricks-based architecture, which is a cloud platform for running data lake applications. Databricks is available from Databricks, Inc. of San Francisco, Calif., USA. Databricks can provide a unified analytics platform that can host and run any number of apps. These embodiments are sample embodiments and other configurations with other architectures and mechanisms to support data lake applications can be provided. For example, Azure Databricks available from Microsoft could be utilized.

Some data lake implementations are based on Apache Hadoop, which provides various software utilities that provide distributed processing of large data sets across multiple computing devices. Other data lake implementations can be based on Apache Spark, which provides a framework for real time data analytics using distributed computing resources. Other platforms and mechanisms can be utilized to manage data lakes (or other large collections of data). Both Hadoop and Spark are available from The Apache Software Foundation of Wakefield, Mass., USA.

Current configurations of Databricks do not provide for the ability to run Databricks outside of a managed cloud environment, which results in challenges for providing continuous integration and continuous deployment (CI/CD) for data lake applications. Providing CI/CD introduces further complexities to leverage Databricks libraries and utilities such as, for example, Databricks Connect and Databricks Command Line Interface (CLI) due to the overhead of installation and configurations. Described herein is a CI/CD framework that can function to provide a seamless experience for developing, for example, Spark-based Delta Lake applications from local developer environments including testing, production deployment and application runs. Other non-Apache based architectures and frameworks can be supported using the novel concepts described herein.

As described in greater detail below, the architectures and techniques described herein can provide "out-of-the-box" functionalities to deploy, test and run Delta Lake Spark applications on Databricks from any environment (e.g., local, on premise, cloud). Further a template can be provided to define a deployment specification of Delta Lake Spark application(s) on Databricks. Similar architectures can be utilized to provide non-Apache and/or non-Databricks embodiments having the same or similar functionality.

FIG. 1 is one embodiment of an example Docker file that can be utilized to support providing continuous integration and continuous deployment (CI/CD) for data lake applications. In an example embodiment, a Docker image (or similar container-type structure) is built to abstract away the complexity of satisfying Databricks dependencies and to provide out-of-the-box functionalities consistently across different environments. Docker is a set of platforms as a service (PaaS) components that utilized operating system (OS)-level virtualization to provide containers that are isolated from one another and bundle their own software, libraries and configuration files, but can communicate with each other through defined channels. Docker is available from Docker, Inc. of Palo Alto, Calif., USA.

In the example of FIG. 1, file 100 can include at least two parts. The first part of file 100 is dependencies 120 and the second part of the file is the deployment script 140. In one embodiment, there is a separate process to build the Docker image and publish it to an internal repository. In one embodiment, the base image used by the Docker file (e.g., docker.amz.relateiq.com/cbase/base20190722) contains root certificates to allow the Databricks CLI and application program interfaces (APIs) to be executed through, for example, HyperText Transfer Protocol Secure (HTTPS). The Docker file can install Databricks CLI, copy necessary scripts and execute the deployment script when a container based on its image is run.

FIG. 2 is one embodiment of an example structure to create a container that can be utilized to support providing CI/CD for data lake applications. Command structure 200 is a Databricks example implementation; however, non-Databricks variations can also be supported.

In one embodiment, Build Type 210 (BUILD_TYPE) indicates the type of build to run (e.g., PR, STAGING, PERF, PROD). Deployment environment 220 (DEPLOY_ENV) indicates the target environment to which the container will be deployed (e.g., STAGING, PERF, PROD). In one embodiment, cluster profile 230 (AWS_INSTANCE_PROFILE_ARN) indicates the cloud role assigned to the runtime cluster. The example of FIG. 2 is based on Amazon Web Services (AWS) available from Amazon, Inc. of Seattle, Wash., USA; however, other configurations can also be utilized.

In one embodiment, Databricks Host 240 (DATABRICKS_HOST) indicates the Uniform Resource Locator (URL), or other indicator, for the Databricks host. Databricks Token 250 (DATABRICKS_TOKEN) indicates the Databricks access token that will be used by the Databricks CLI or Databricks API. Image name 260 (IMAGE_NAME) is the Docker image name in the internal Docker repository.

Figure 3:
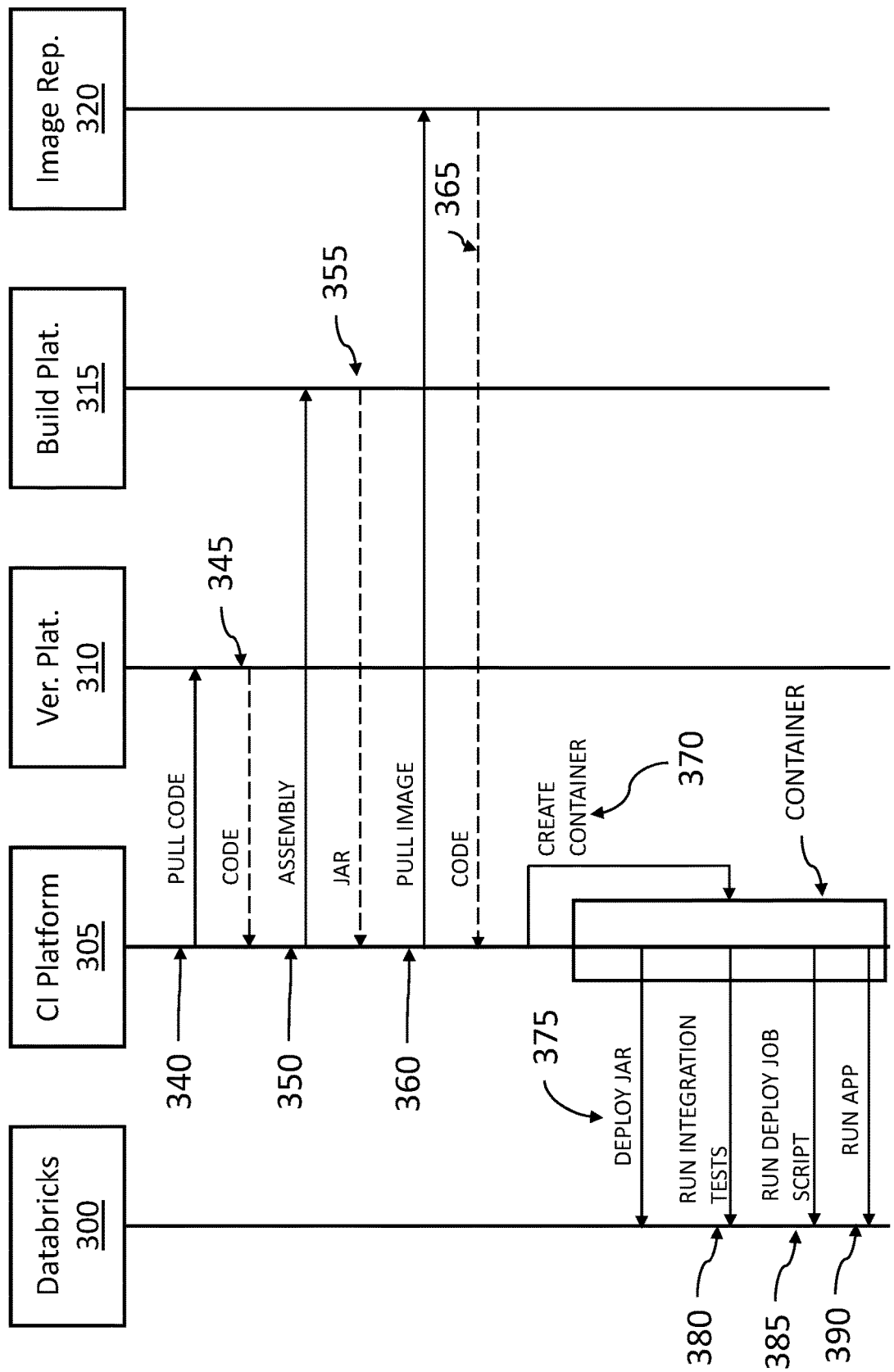
FIG. 3 is a workflow diagram of one embodiment of deployment and running of an app in a Databricks-based CI/CD environment.

FIG. 3 is a workflow diagram of one embodiment of deployment and running of an app in a Databricks-based CI/CD environment. The example of FIG. 3 is based on five underlying components or elements. Alternate embodiments can have more and/or different components.

In one embodiment, Databricks 300 can provide the environment in which the app can run. As mentioned above, Databricks is an open source computing framework that can provide an operating environment in a data lake architecture. Alternative environments can also be supported. In one embodiment, CI platform 305 can provide a build management and CI platform (e.g., server) to manage the workflow of FIG. 3. In one embodiment, CI platform 305 can be provided by TeamCity, which is available from JetBrains s.r.o. of Prague, Czech Republic. Alternative platforms can also be utilized.

In one embodiment, version platform 310 can provide version control functionality for managing changes in source code or other types of files. In one embodiment, version platform 310 can be, for example, Git available from GitHub of San Francisco, Calif., USA. Other platforms can be utilized to provide version control functionality. In one embodiment, build platform 315 can provide continuous compilation, testing and deployment functionality. Build platform 315 can be, for example, sbt available from Lightbend, Inc. of San Francisco, Calif., USA. Alternative platforms, for example, Maven or Ant, can be utilized to provide continuous deployment functionality.

In one embodiment, Docker Image Repository 320 functions to store or host any number of Docker images. Docker Image Repository 320 can be, for example, a virtual machine (VM) that functions as the repository. In other example embodiments, Docker Image Repository 320 can be a Docker Hub repository.

In one embodiment, a root folder (or other structure) can be set up to contain all deployment specification files grouped by environment. An environment can be, for example, development, staging, performance, production, etc. The deployment script can be used to read files from a specified folder of an environment and be used to create or update job operations for each file. One example folder structure is described in greater detail below.

In one embodiment, CI platform 305 can pull code for the app to be deployed (340) from version platform 310. Version platform 310 returns the code (345). CI platform 305 causes the code to be assembled (350) by build platform 315, which results in, for example, a Java Archive (jar) file (355). Other programming languages and/or coding structures can also be utilized.

CI platform 305 also functions to pull a container image (360) from Docker Image Repository 320 and utilizes the received image (365) to create a container (370). The container can be utilized to deploy the jar file (375) to Databricks environment 300, run integration tests (380) in Databricks environment 300, run deploy job script (385) in Databricks environment 300, and/or run the app (390) in Databricks environment 300.

Figure 4:
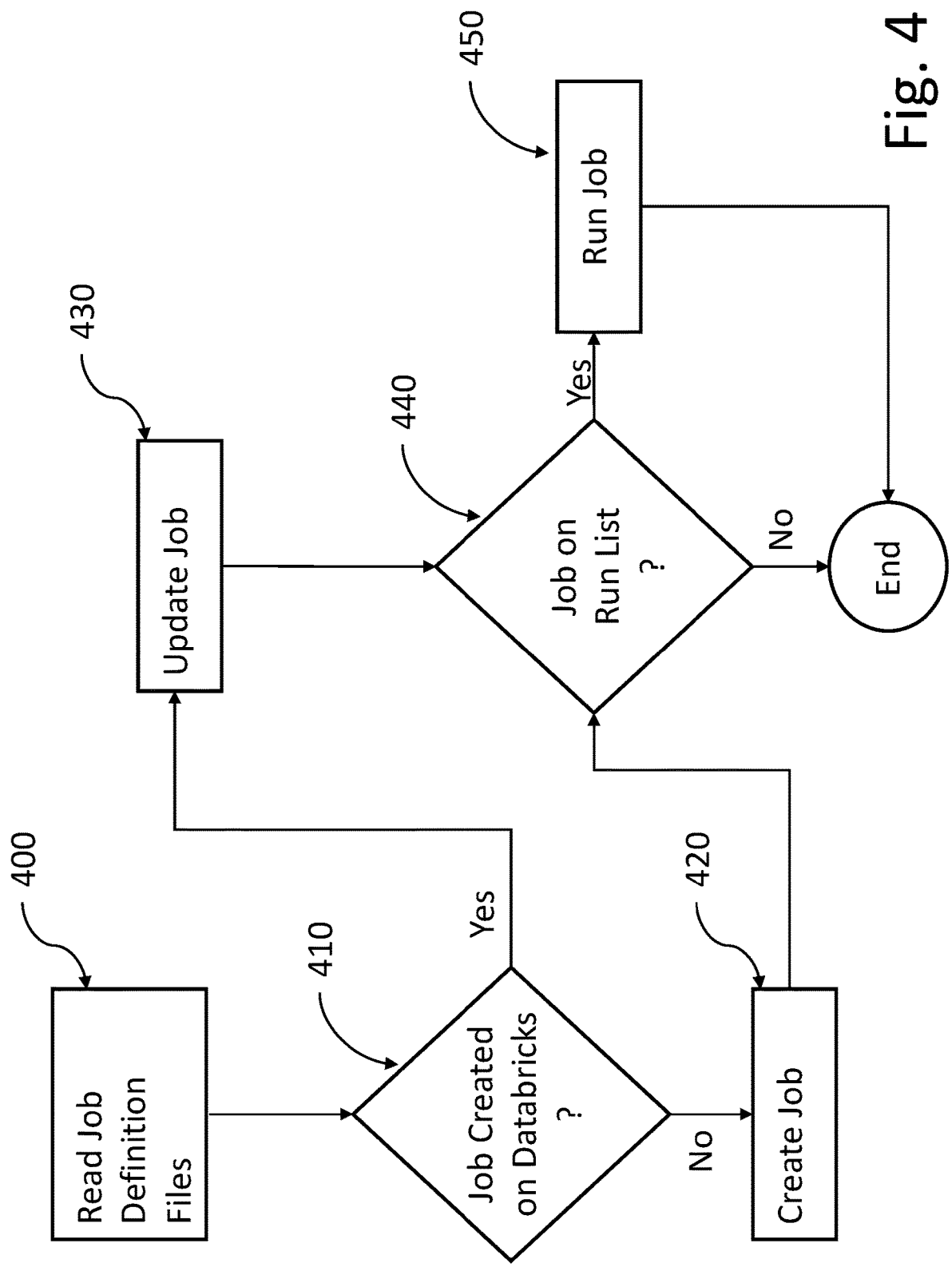
FIG. 4 is a flow diagram of one embodiment of a technique to run a job in a CI/CD environment configured according to the workflow of FIG. 3.

FIG. 4 is a flow diagram of one embodiment of a technique to run a job in a CI/CD environment configured according to the workflow of FIG. 3. In one embodiment, the technique of FIG. 4 can be provided by a CI platform (e.g., 305 in FIG. 3). In alternate embodiments, one or more other components can provide the functionality described.

In one embodiment, all job definition files are read, 400. For each job, if the job has been created in the Databricks environment (as described with respect to FIG. 3), 410, the job can be updated, 430. If the job has not been created in the Databricks environment, 410, the job can be created, 420.

After the job has been created (420) or updated (430), the run list is checked to determine if the job is included, 440. If the job is on the run list, 440, the job is run, 450. If the job is not on the run list, 440, the process can terminate. The process of FIG. 4 can be repeated as necessary.

Figure 5:
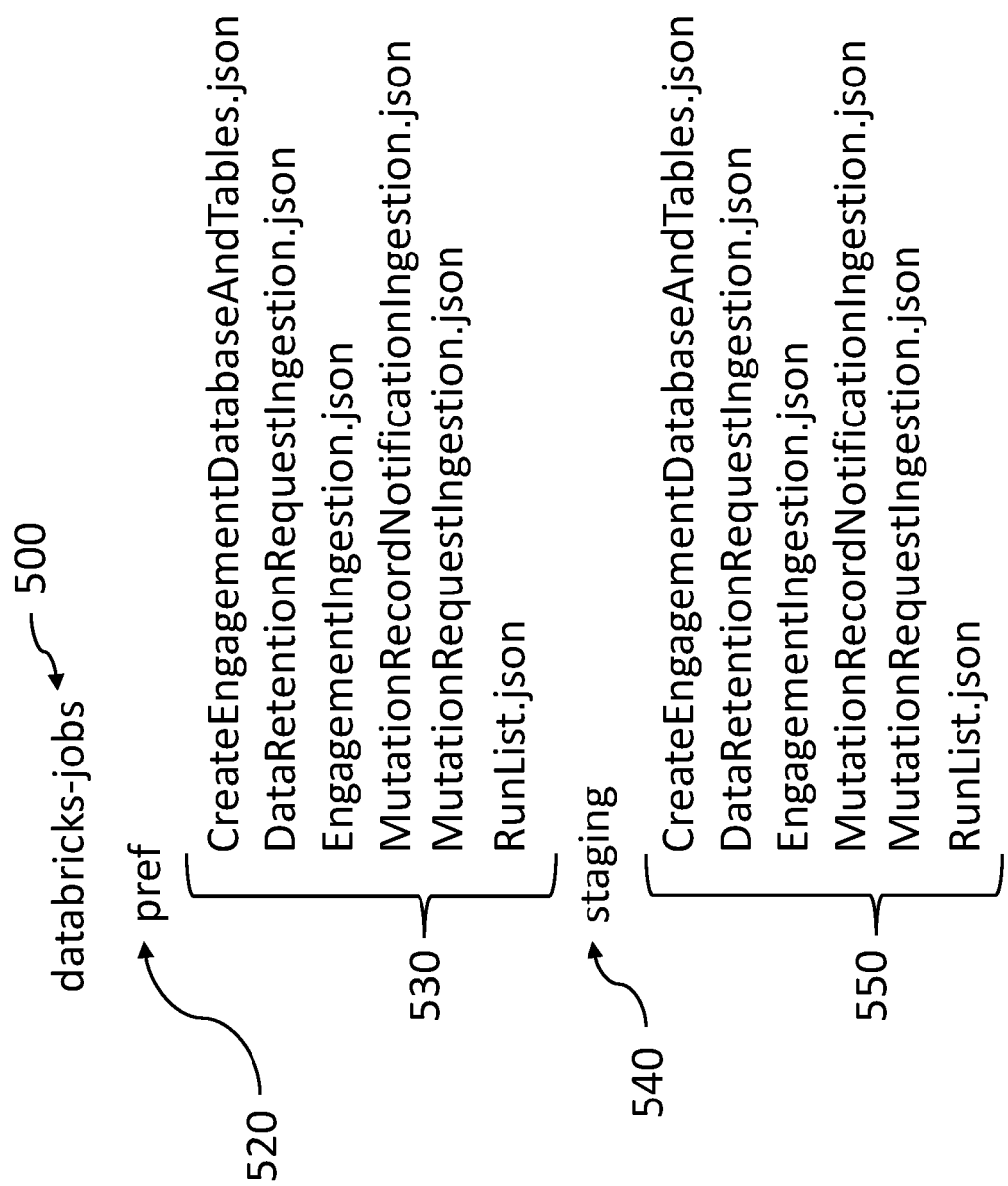
FIG. 5 illustrates one embodiment of a folder structure that can be utilized to support the architectures and techniques described herein.

FIG. 5 illustrates one embodiment of a folder structure that can be utilized to support the architectures and techniques described herein. The example of FIG. 5 is just one structure that can be utilized. In one embodiment, applications provide a deployment specification to instruct the deployment script how to deploy the app in a Databricks environment (e.g., 300 in FIG. 3).

In one embodiment, within jobs folder ("databricks-jobs") 500, one or subfolders (e.g., 520, 540) can be utilized to further organize files related to providing a Databricks-based CI/CD environment. The example files (e.g., 530, 550) illustrated in FIG. 5 are just one example collection of files that can be utilized to provide the functionality described herein.

As discussed above, Databricks is a cloud platform for running, for example, Delta Lake Spark applications. However, in Databricks environments (or similar platforms), there are many challenges to applying and automating integration testing. For example, it is difficult to build an isolated application runtime context that may be required by each integration test suite execution on a shared cloud-based environment. Delta Lake Spark applications, for example, are richly integrated with external services including, for example, Apache Kafka for stream processing, Delta Lake Tables for database (e.g., SQL) operations, Apache Zookeeper, etc. Further, given that these applications provide a dedicated, relatively small piece of functionality as a microservice, then number of applications may grow rapidly.

Without a good mechanism to effectively organize the applications, deploy testbeds and develop test scenarios, the resulting applications can be vulnerable to bugs, defects and errors. Various concepts and designs are described to overcome these challenges and provide a robust quality assurance mechanism for applications on a shared cloud platform environment.

At a high level, Delta Lake Spark applications can be utilized to provide three types of stream processing: 1) data stream ingestion with associated writes to multiple tables (e.g., data tables); 2) change data capture (CDC) stream management (aka, mutations) for data sources and merging the mutations with the multiple tables; and 3) data privacy management (e.g., General Data Protection Regulation, or GDPR, processing) to manage data retention and delete functionality.

As described in greater detail below, an organizational concept referred to herein as a "scenario" can be utilized to effectively organize applications and associated integration tests. In general, a scenario is a group of relevant applications that collectively fulfill certain kinds of functionalities. In various embodiments, test cases are developed per scenario.

In one embodiment, each scenario is defined by a scenario specification that includes three components: 1) metadata that describes the scenario; 2) a list of applications needed to perform the relevant functionalities of the scenario; and 3) a list of integration tests to verify the expected behaviors of the applications in the scenario.

As illustrated in the examples below, in the example embodiments, each scenario specification is self-contained and only addresses one application function, the applications and tests are only relevant to that application function, and one application may appear across multiple scenario specifications.

As one example, an EngagementIDMutation scenario can be defined as:

```
{
  "name": "EngagementIdMutation",
  "description":"Merge mutation record into engagement data table",
  "applications": [
     "CreateDatabaseAndTables",
     "EngagementIngestion",
     "MutationRecordIngestion",
     "IDMutationProcess"
  ],
  "tests": [
     "com.salesforceiq.sas.engagement.it.EngagementIdMutationIntegrationTest.scala"
  ]
}
```

As another example, a NameMutation scenario can be defined as:

```
{
  "name": "NameMutation",
  "description":"Merge mutation record into engagement data table",
  "applications": [
     "CreateDatabaseAndTables",
     "EngagementIngestion",
     "MutationRecordIngestion",
     "NameMutationProcess"
  ],
  "tests": [
     "com.salesforceiq.sas.engagement.it.NameMutationIntegrationTest.scala"
  ]
}
```

Figure 6:
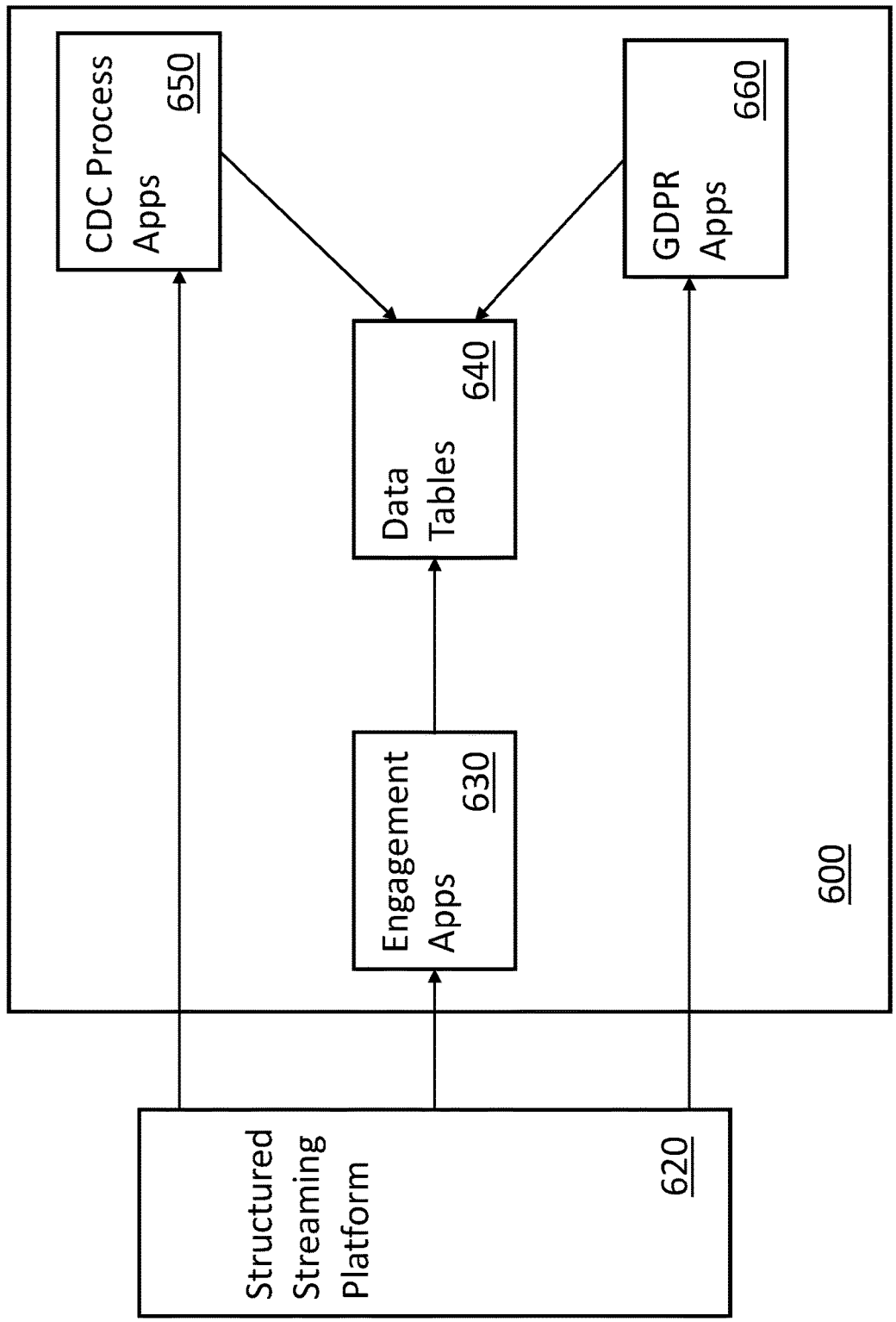
FIG. 6 is a block diagram of one embodiment of an environment to manage data tables in a Databricks environment.

FIG. 6 is a block diagram of one embodiment of an environment to manage data tables in a Databricks environment. In the example of FIG. 6, structured streaming 620 can provide a platform to utilize one or more scenario specifications to manage apps (e.g., 630, 650, 660) in Databricks environment 600, the flow of which is described in greater detail in FIG. 8.

In one embodiment, engagement app(s) 630 can function to manage the ingestion of data into a data lake or other environment. As part of this process, engagement app(s) 630 can write to data table(s) 640. CDC process app(s) 650 can function to mange mutations (or merging) of data in data table(s) 640. GDPR process app(s) 660 can function to manage deletions of data from data table(s) 640.

Figure 7:
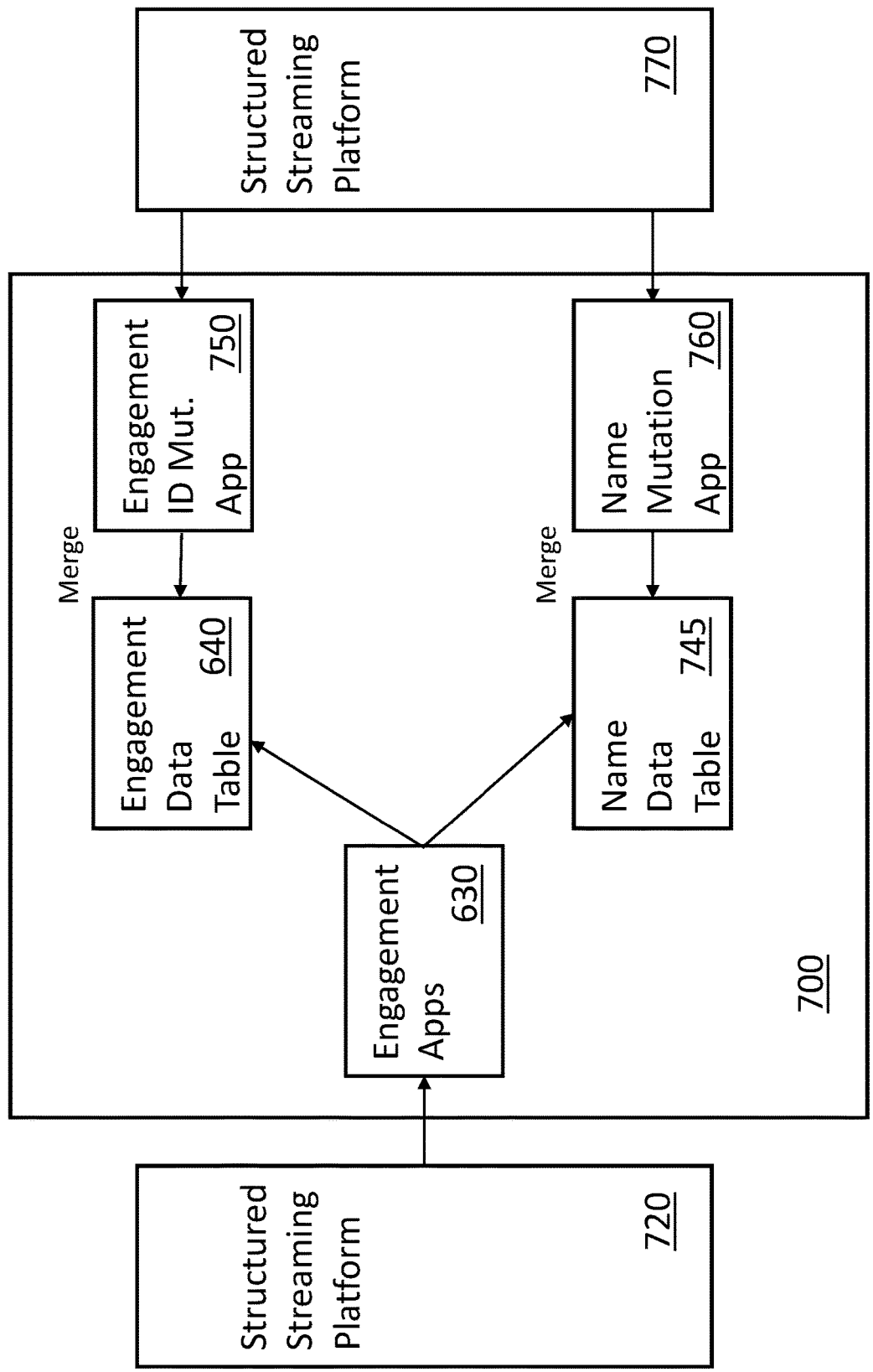
FIG. 7 is a block diagram of one embodiment of an environment to manage data tables in a Databricks environment.

FIG. 7 is a block diagram of one embodiment of an environment to manage data tables in a Databricks environment. In the example of FIG. 7, structured streaming platforms 720 and 770 can provide a platform to utilize one or more scenario specifications to manage apps (e.g., 730, 750, 760) in Databricks environment 700, the flow of which is described in greater detail in FIG. 8.

In one embodiment, engagement ingestion app(s) 730 can function to manage the ingestion of data into a data lake or other environment. As part of this process, engagement app(s) 730 can write to engagement data table 740 and to name data table 745. Engagement ID Mutation app(s) 750 can function to manage mutations (or merging) of data in engagement data table 740. Similarly, Name Mutation app(s) 760 can function to manage mutations (or merging) of names in name data table 745.

Figure 8:
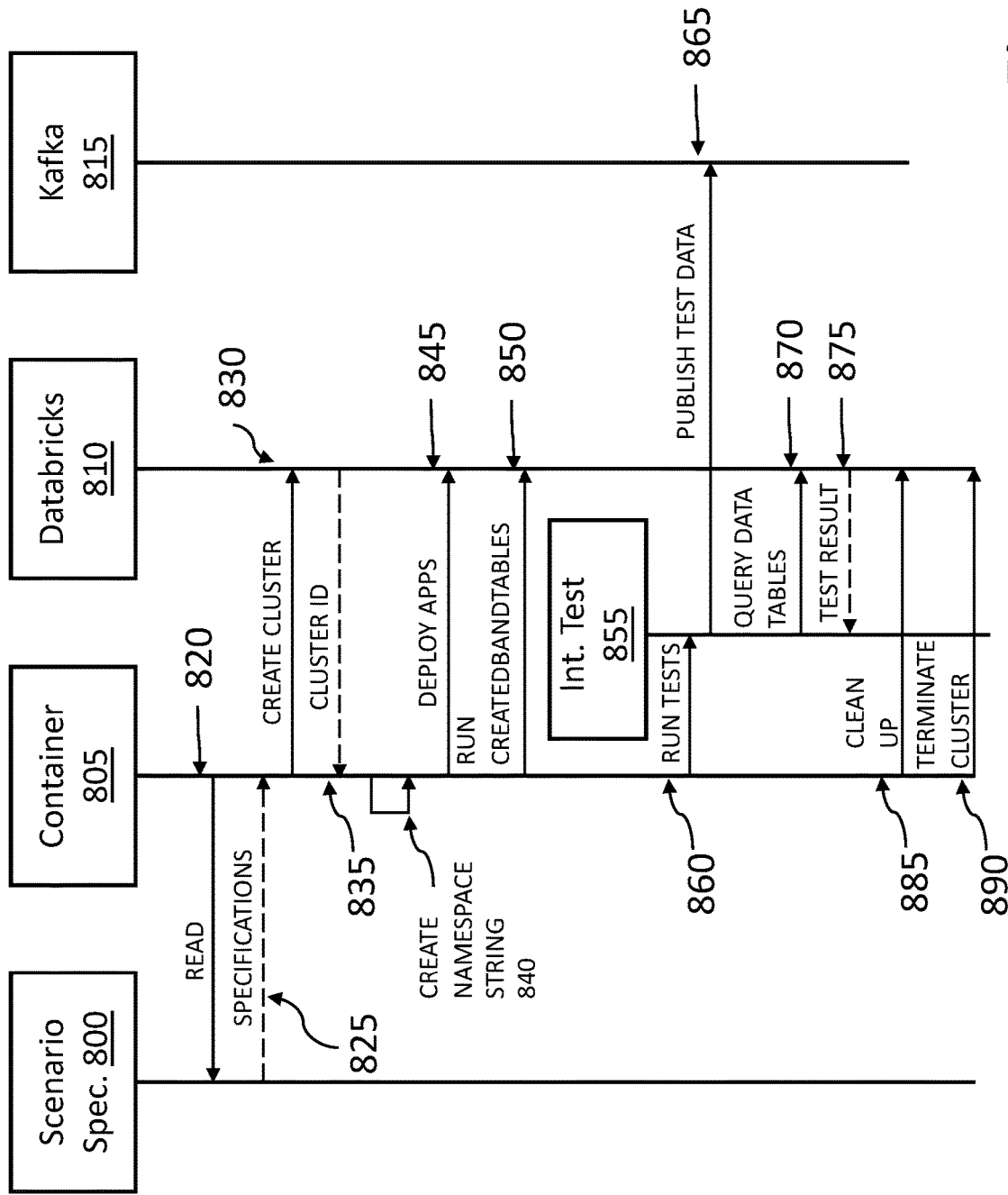
FIG. 8 illustrates one embodiment of a workflow for utilizing scenario specifications to deploy and test apps in a Databricks-based environment.

FIG. 8 illustrates one embodiment of a workflow for utilizing scenario specifications to deploy and test apps in a Databricks-based environment. In the example workflow of FIG. 8, logic within container 805 can utilize one or more scenario specifications 800 to deploy and test apps within Databricks environment 810 and can publish the test data, for example, to data environment 815.

In one embodiment, logic within container 805 can read one or more scenario specifications, 800 and 825. In some example embodiments, the scenario specifications can be in the form of JavaScript Object Notation (JSON) files and can be organized in directories as illustrated in FIG. 5. Other file types and/or other structures can also be supported.

Retrieved specifications (825) can be utilized to create a cluster (830) in Databricks environment 810. A cluster ID is returned (835) from Databricks environment 810 to container 805. The logic in container 805 can create a namespace string, 840 to create scoped objects. In one embodiment, a namespace is a globally unique string to define the scope of an application runtime context. Use of the namespace string and benefits from its use are described in greater detail below with respect to FIGS. 9 and 10.

The namespace string can be utilized to deploy one or more apps (845) to Databricks environment 810 by passing the cluster ID and the namespace to build a private testbed. The logic in container 805 can then cause one or more database tables to be created (850) in Databricks environment 810.

After the apps have been deployed, logic within container 805 can run tests (806) with integration test platform 855. The resulting test data can be published (865) to Kafka environment 815, or a similar data streaming environment. In one embodiment, integration test platform 855 can provide one or more query tables (870) to Databricks environment 810.

The query tables can be utilized for testing within Databricks environment 810 and test results can be returned (875) to integration test platform 855. Clean-up operations can then be performed (880) in response to integration test platform 855, and clean-up operations can be performed (885) in response to logic in container 810. Upon completion, the cluster can be terminated, 890.

In one embodiment, each integration test execution (with associated scenario specification) is run in a private testbed in which: 1) a new cluster is created as a separate runtime environment, and 2) scoped objects with a given namespace are created by applications (and their dependent services), which can be considered Isolated Application Runtime Context (IARC).

As used herein, application context is an abstraction of an application runtime as a component to build an isolated runtime context. In one embodiment, it could be a SCALA class. In one embodiment, the namespace and application properties can be used as inputs to generate scoped properties with which dependent services can use to create scoped objects. Examples of dependent services include Apache Kafka, Zookeeper, AWS S3, Sumo Logic, Datadog.

Figure 9:
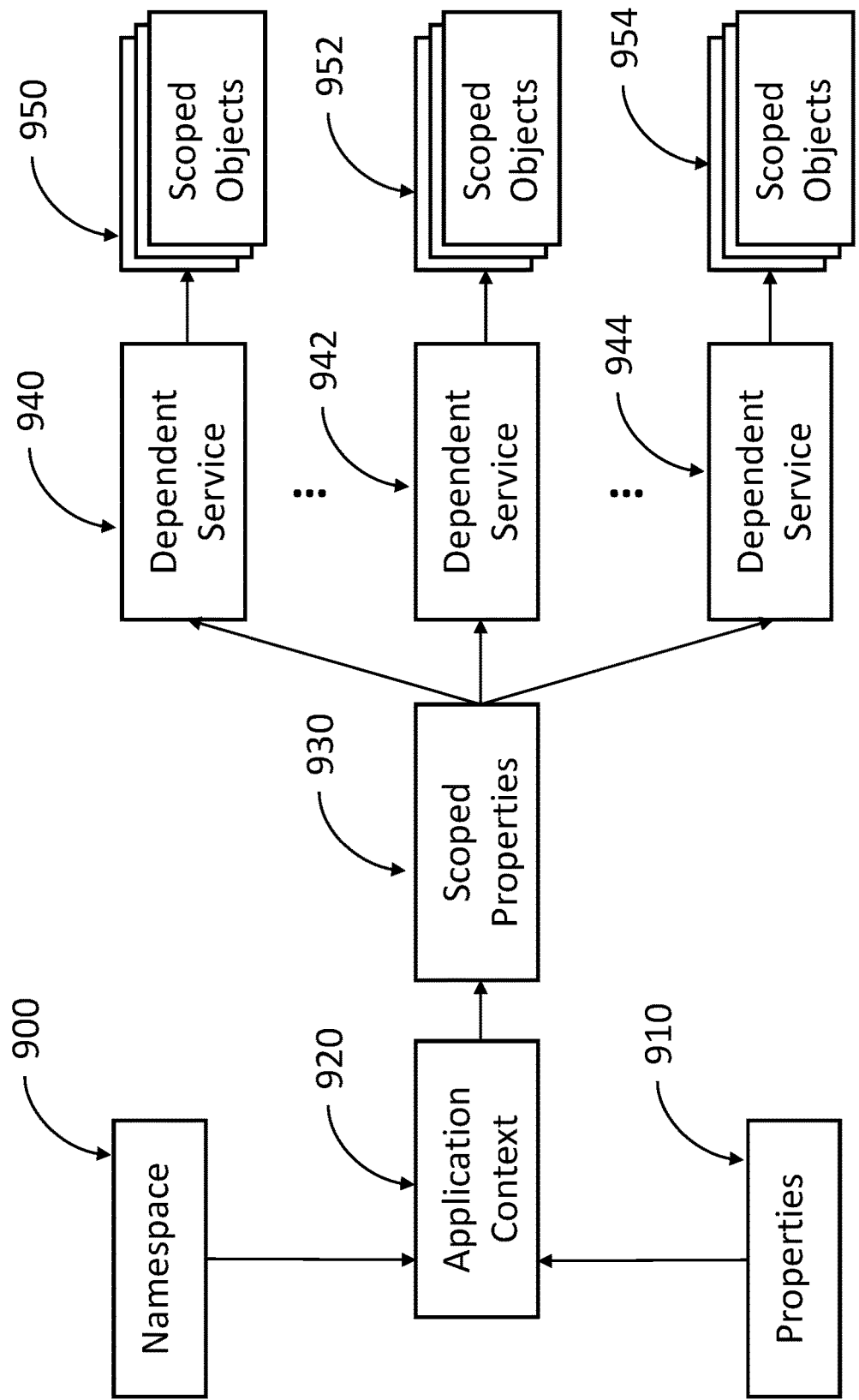
FIG. 9 provides a conceptual illustration of an isolated runtime context.

FIG. 9 provides a conceptual illustration of an isolated runtime context. As described above, namespace 900 and properties 910 can be utilized to create application context 920. In one example embodiment, application context 920 can use the following rules to generate scoped properties 930.

| Property Key | Value | Scoped Value |
| --- | --- | --- |
| Kafka.topics | Topic1,Topic2 | {namespace}-topic1,{namespace}-topic2 |
| Database.name | sas | {namespace}_sas |
| S3.bucket | Bucket | Bucket/namespace |
| Application_name | appName | {namespace}_appName |

The first column ("Property Key") is the set of property keys to be consumed by dependency services, second column ("Value") contains sample values for those property keys, and the third column ("Scoped Value") indicates the resulting scoped values. Scoped properties 930 can then be utilized to create one or more dependent services (e.g., 940, 942, 944), each of which can have corresponding scoped objects (e.g., 950, 952, 954).

Figure 10:
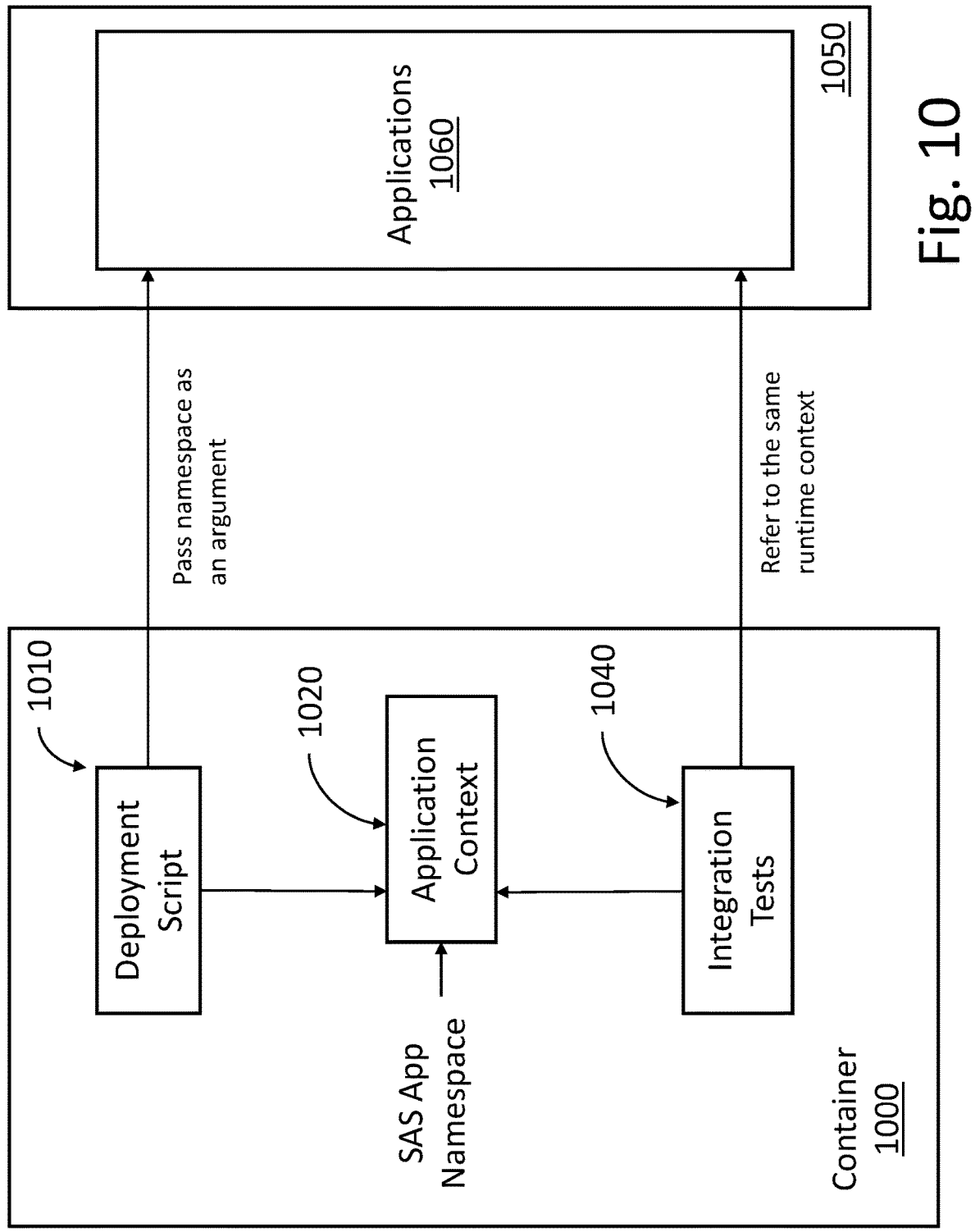
FIG. 10 is a block diagram of one embodiment of an environment utilizing namespaces to provide application context.

FIG. 10 is a block diagram of one embodiment of an environment utilizing namespaces to provide application context. In various embodiments, tests create application context object 1020 with the same namespace in order to refer to the correct isolated application runtime context, 1050, running any number of applications, 1060. In the example of FIG. 10, deployment scripts (e.g., 1010) and/or integration tests (3.g., 1040) can be run in the same container environment (e.g., 1000) and share the same application context object (e.g., 1020).

The techniques and architectures described herein can provide separation of concerns in terms of deployment and integration testing for Delta Lake Spark (and other types of) application in a shared environment (e.g., Databricks). In some embodiments, with the design of a scenario, applications and tests can be organized, and test cases can be developed within a scenario. In some embodiments, utilizing scenario specifications, scenario-based deployment and integration testing can be achieved. In some embodiments, utilizing namespaces and application context, an isolated application runtime context can be built for each integration testing execution in a shared (e.g., Databricks) environment.

Figure 11:
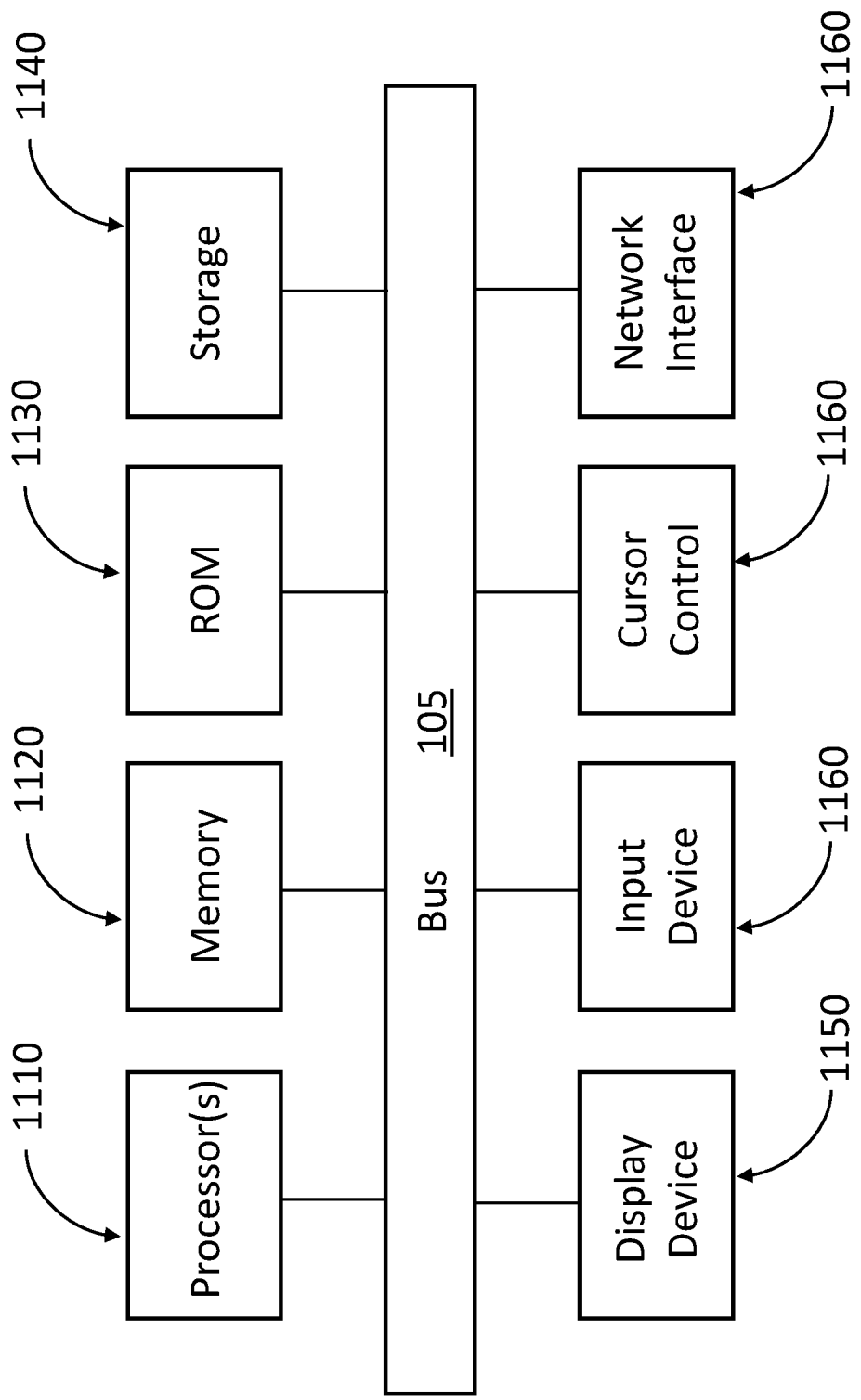
FIG. 11 is a block diagram of one embodiment of an electronic system.

FIG. 11 is a block diagram of one embodiment of an electronic system. The electronic system illustrated in FIG. 11 is intended to represent a range of electronic systems (either wired or wireless) including, for example, desktop computer systems, laptop computer systems, cellular telephones, smartphones, tablets, wearable computing devices, etc. Alternative electronic systems may include more, fewer and/or different components.

Electronic system 1100 can provide the functionality of one or more of the platforms and/or environments described above (e.g., a Databricks environment, a CI platform). Further, electronic system 1100 can provide the data lake functionality and/or ingestion functionality discussed above. In alternative embodiments, different numbers of electronic systems can be interconnected (e.g., via networks and/or direct connection) to provide increased bandwidth and/or resources.

In one embodiment, electronic system 1100 includes bus 1105 or other communication device to communicate information, and processor 1110 coupled to bus 1105 that may process information. While electronic system 1100 is illustrated with a single processor, electronic system 1100 may include multiple processors and/or co-processors and each processor can include multiple processor cores. Electronic system 1100 further may include random access memory (RAM) or other dynamic storage device 1120 (referred to as main memory), coupled to bus 1105 and may store information and instructions that may be executed by processor 1110. Main memory 1120 may also be used to store temporary variables or other intermediate information during execution of instructions by processor 1110.

Electronic system 1100 may also include read only memory (ROM) and/or other static storage device 1130 coupled to bus 1105 that may store static information and instructions for processor 1110. Data storage device 1140 may be coupled to bus 1105 to store information and instructions. Data storage device 1140 such as a magnetic disk or optical disc and corresponding drive may be coupled to electronic system 1100. Instructions stored on data storage device 1140 can be executed by processor 1110 to provide some or all of the functionality described herein.

Electronic system 1100 may also be coupled via bus 1105 to display device 1150, such as a liquid crystal display (LCD) or other display device, to display information to a user. Alphanumeric input device 1160, including alphanumeric and other keys, may be coupled to bus 1105 to communicate information and command selections to processor 1110. Another type of user input device is cursor control 1170, such as a mouse, a trackball, or cursor direction keys to communicate direction information and command selections to processor 1110 and to control cursor movement on display 1150.

Electronic system 1100 further may include network interface(s) 1180 to provide access to a network, such as a local area network. Network interface(s) 1180 may include, for example, a wireless network interface having antenna 1185, which may represent one or more antenna(e). Network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, network interface(s) 1180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   a constant integration (CI) platform to manage assembly of code for an app, the CI platform to create a container within a shared environment within which the app runs, wherein the container is isolated from other containers and bundles software, libraries and configuration files and can communicate with other containers through defined channels, and the shared environment provides a platform for running the app;
   the app to write to one or more tables maintained in the shared environment;
   wherein the CI platform functions to manage assembly of subsequent versions of code for the app, assembly of the subsequent version of code and to deploy the assembled subsequent version of the code to the container, the CI platform further to run integration tests on the deployed subsequent version of the code, and when integration testing is complete, cause the subsequent version of the code to replace the app in the shared environment.

2. The system of claim 1, wherein the CI platform utilizes one or more scenario specifications to run the integration tests, wherein each of the one or more scenario specifications comprise:
   metadata that describes a scenario;
   a list of applications to perform the relevant functionalities of the scenario; and
   a list of integration tests to verify expected behaviors of the applications in the scenario.

3. The system of claim 1, wherein the app is deployed to an isolated runtime context based on a namespace corresponding to an application context and properties corresponding to the application context, the application context to be utilized to develop scoped properties.

4. The system of claim 3, wherein one or more dependent services each having one or more scoped objects function within the scoped properties.

5. The system of claim 3 wherein the application context is utilized to generate the integration tests and to generate a deployment script that utilizes the namespace to limit app scope.

6. The system of claim 1 further comprising:
   the constant integration (CI) platform to manage assembly of code for a second app to run in the container;
   the second app to write to the one or more tables maintained in the shared environment;
   wherein the CI platform functions to manage assembly of subsequent versions of code for the second app, assembly of the subsequent version of code for the second app and to deploy the assembled subsequent version of the code for the second app to the container, the CI platform further to run integration tests on the deployed subsequent version of the code for the second app, and when integration testing is complete, cause the subsequent version of the code for the second app to replace the second app in the shared environment.

7. A non-transitory computer-readable medium having stored thereon instructions that, when executed by one or more processors, are configurable to cause the one or more processors to:
   manage assembly of code for an app with a constant integration (CI) platform to create a container within a shared environment within which the app runs, wherein the container is isolated from other containers and bundles software, libraries and configuration files and can communicate with other containers through defined channels, and the shared environment provides a platform for running the app;
   run the app to write to one or more tables maintained in the shared environment;
   manage assembly, with the CI platform, of subsequent versions of code for the app;
   manage assembly, with the CI platform, deployment of the assembled subsequent version of the code to the container;
   run, with the CI platform, integration tests on the deployed subsequent version of the code; and
   cause, with the CI platform, the subsequent version of the code to replace the app in the shared environment when integration testing is complete.

8. The non-transitory computer-readable medium of claim 7, wherein the CI platform utilizes one or more scenario specifications to run the integration tests, wherein each of the one or more scenario specifications comprise:
   metadata that describes a scenario;
   a list of applications to perform the relevant functionalities of the scenario; and
   a list of integration tests to verify expected behaviors of the applications in the scenario.

9. The non-transitory computer-readable medium of claim 7, wherein the app is deployed to an isolated runtime context based on a namespace corresponding to an application context and properties corresponding to the application context, the application context to be utilized to develop scoped properties.

10. The non-transitory computer-readable medium of claim 9, wherein one or more dependent services each having one or more scoped objects function within the scoped properties.

11. The non-transitory computer-readable medium of claim 9 wherein the application context is utilized to generate the integration tests and to generate a deployment script that utilizes the namespace to limit app scope.

12. The non-transitory computer-readable medium of claim 7 further comprising instructions that, when executed by the one or more processors, are configurable to cause the one or more processors to:
manage assembly of code for a second app to run in the container with the constant integration (CI) platform to;
run the second app to write to the one or more tables maintained in the shared environment;
manage assembly, with the CI platform, of subsequent versions of code for the second app;
manage assembly, with the CI platform, deployment of the assembled subsequent version of the code to the container;
run, with the CI platform, integration tests on the deployed subsequent version of the code; and
cause, with the CI platform, the subsequent version of the code to replace the second app in the shared environment when integration testing is complete.

13. A method comprising:
managing assembly of code for an app with a constant integration (CI) platform to create a container within a shared environment within which the app runs, wherein the container is isolated from other containers and bundles software, libraries and configuration files and can communicate with other containers through defined channels, and the shared environment provides a platform for running the app;
running the app to write to one or more tables maintained in the shared environment;
managing assembly, with the CI platform, of subsequent versions of code for the app;
managing assembly, with the CI platform, deployment of the assembled subsequent version of the code to the container;
running, with the CI platform, integration tests on the deployed subsequent version of the code; and
causing, with the CI platform, the subsequent version of the code to replace the app in the shared environment when integration testing is complete.

14. The method of claim 13, wherein the CI platform utilizes one or more scenario specifications to run the integration tests, wherein each of the one or more scenario specifications comprise:
metadata that describes a scenario;
a list of applications to perform the relevant functionalities of the scenario; and
a list of integration tests to verify expected behaviors of the applications in the scenario.

15. The method of claim 13, wherein the app is deployed to an isolated runtime context based on a namespace corresponding to an application context and properties corresponding to the application context, the application context to be utilized to develop scoped properties.

16. The method of claim 15, wherein one or more dependent services each having one or more scoped objects function within the scoped properties.

17. The method of claim 15 wherein the application context is utilized to generate the integration tests and to generate a deployment script that utilizes the namespace to limit app scope.

18. The method of claim 13 further comprising:
managing assembly of code for a second app to run in the container with the constant integration (CI) platform to;
running the second app to write to the one or more tables maintained in the shared environment;
managing assembly, with the CI platform, of subsequent versions of code for the second app;
managing assembly, with the CI platform, deployment of the assembled subsequent version of the code to the container;
running, with the CI platform, integration tests on the deployed subsequent version of the code; and
causing, with the CI platform, the subsequent version of the code to replace the second app in the shared environment when integration testing is complete.

* * * * *